United States Patent [19]

Sauerwein et al.

[11] 4,440,238

[45] Apr. 3, 1984

[54] SWITCH AND HANDLE CONSTRUCTION FOR DOUBLE-INSULATED ELECTRIC TOOL

[75] Inventors: William D. Sauerwein, Westminster; Lynn E. Lentino, Finksburg, both of Md.

[73] Assignee: Black & Decker Inc., Newark, Del.

[21] Appl. No.: 317,061

[22] Filed: Nov. 2, 1981

[51] Int. Cl.³ .................................... B23B 45/08
[52] U.S. Cl. .................................... 173/170; 173/171
[58] Field of Search ............... 173/169, 170, 171; 200/157, 239; 310/43, 50, 47

[56] References Cited

U.S. PATENT DOCUMENTS

| | | | |
|---|---|---|---|
| 2,450,380 | 9/1948 | Perham | 173/170 |
| 3,352,323 | 11/1967 | Wickham | 137/625.26 |
| 3,352,368 | 11/1967 | Maffey, Jr. | 173/169 |
| 3,381,104 | 4/1968 | Abell et al. | 200/157 |
| 3,432,703 | 3/1969 | Sheps et al. | 310/43 |
| 4,045,650 | 8/1977 | Nestor | 200/339 |

Primary Examiner—Frank T. Yost
Assistant Examiner—Hien H. Phan
Attorney, Agent, or Firm—H. Weinstein; Charles E. Yocum; R. Sherer

[57] ABSTRACT

A double-insulated portable electric tool has a housing with a pistol-grip switch handle portion and a switch cover portion removably secured to the switch handle portion forwardly thereof. An electric switch is mounted on the back of the cover and is provided with an actuating member. A trigger is mounted on the front of the cover and is coupled to the switch actuating member. The switch is accessible only upon removal of the switch cover from the switch handle; and even unauthorized removal of the trigger will not render the switch accessible. As a result, the switch may be replaced easily without an inadvertent interference with the double-insulating feature of the tool.

6 Claims, 20 Drawing Figures

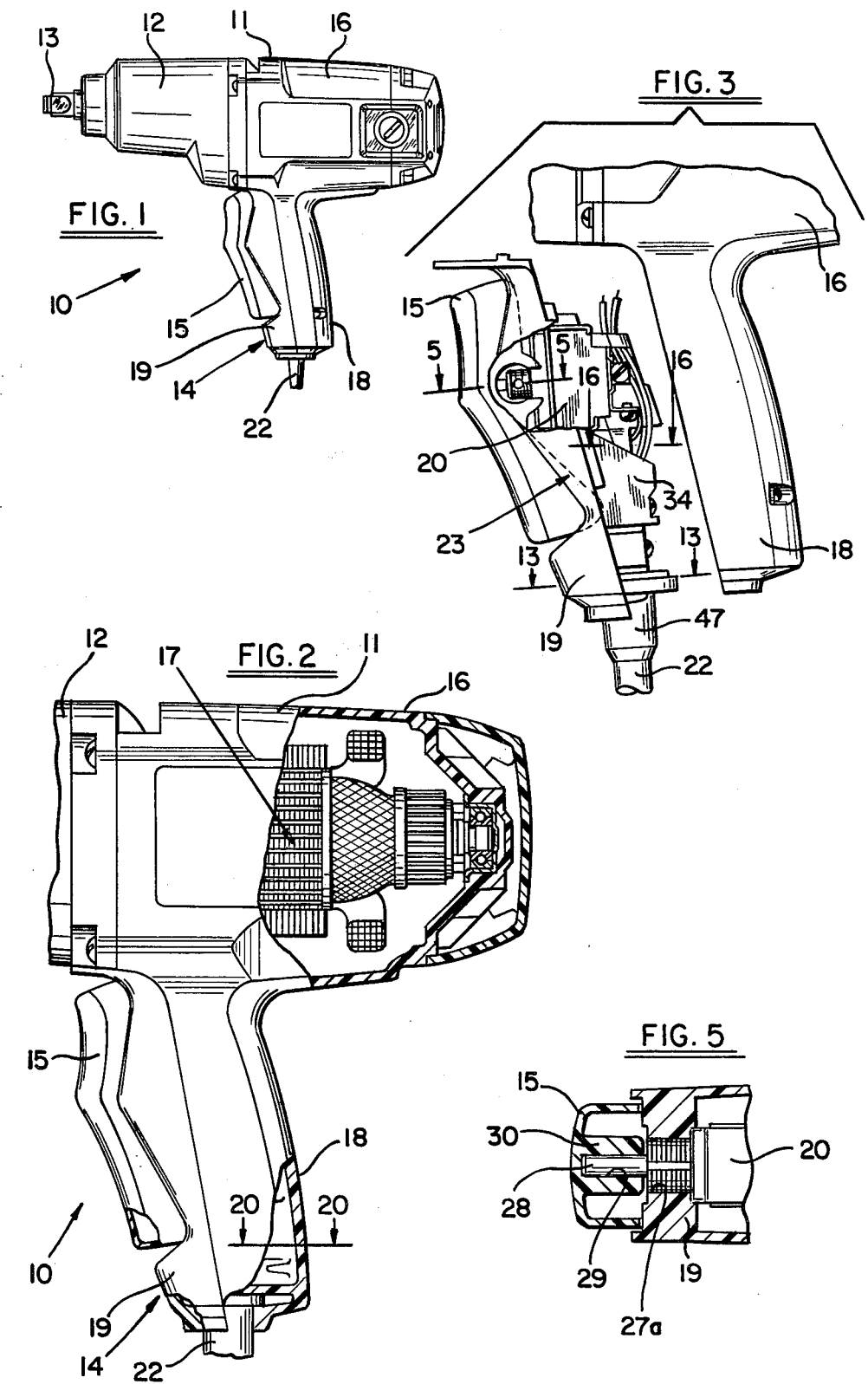

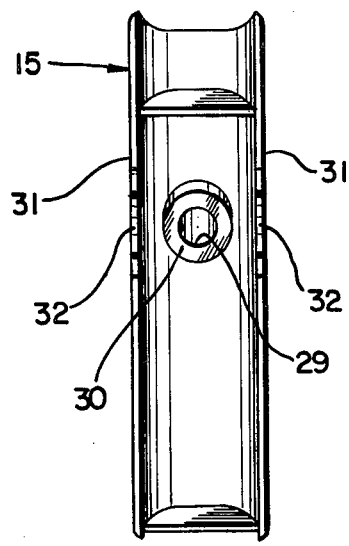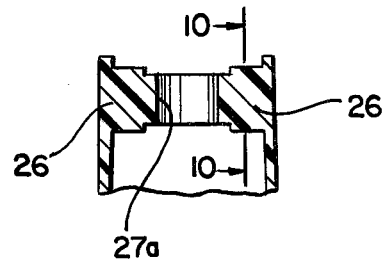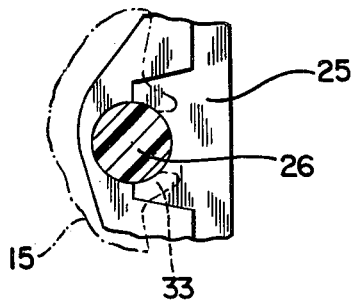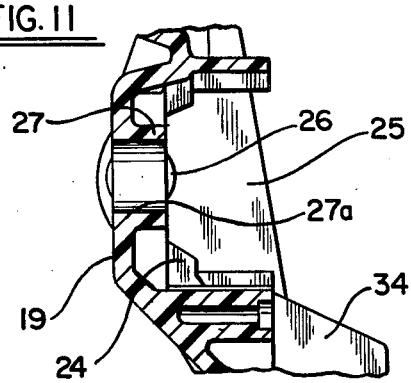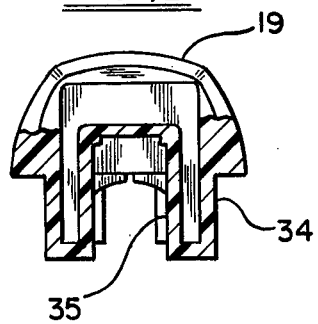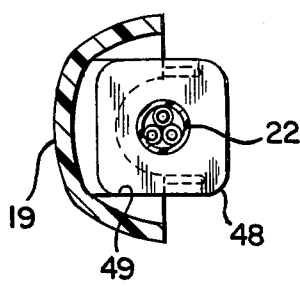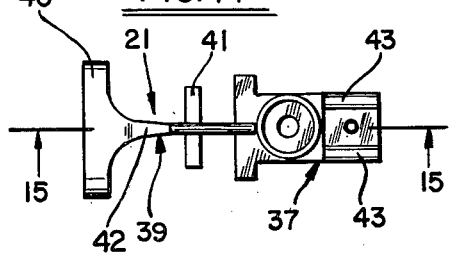

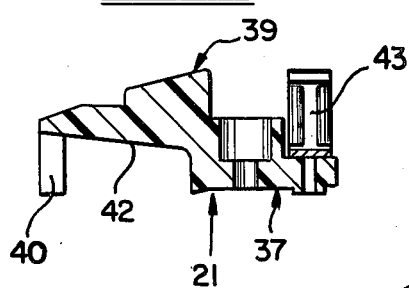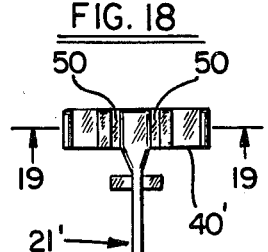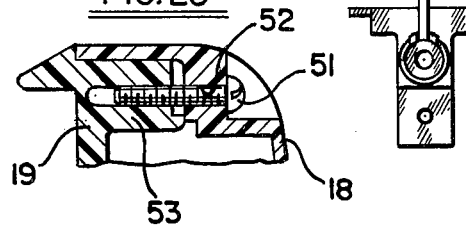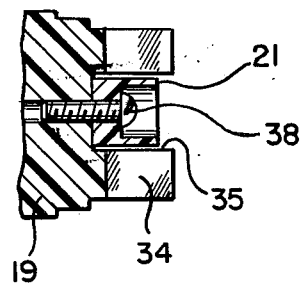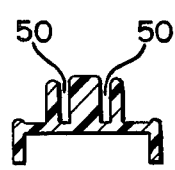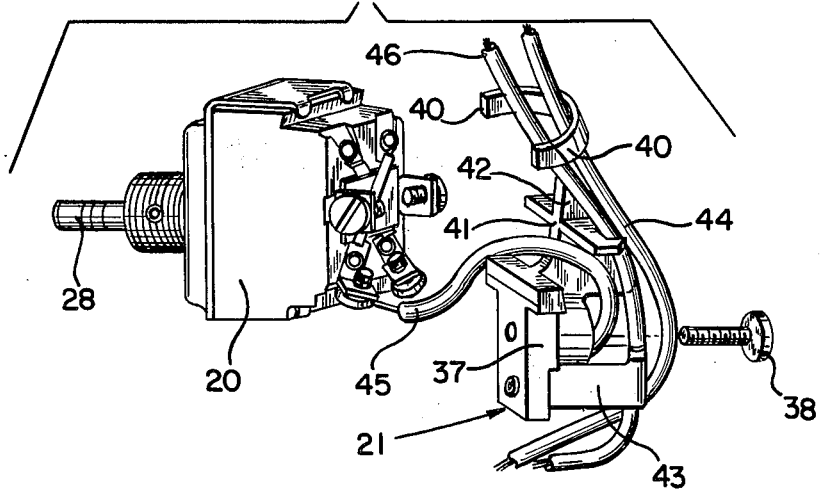

SWITCH AND HANDLE CONSTRUCTION FOR DOUBLE-INSULATED ELECTRIC TOOL

BACKGROUND OF THE INVENTION

In the prior art, of which we are aware, portable electric tools have been provided with pistol-grip handles having trigger-operated switches enclosed therein. The pistol-grip handle comprises a switch handle portion and a switch cover portion removably secured to the switch handle portion forwardly thereof. An electric switch is enclosed in the handle, and the switch is provided with a trigger protruding through an opening in the cover forwardly of the handle. The main body portion of the switch is secured to the switch handle, or else is trapped between complementary bosses as the cover is secured to the switch handle. The trigger is mounted on the switch body or else on the cover itself. Others in the prior art have used a standard toggle switch mounted in the switch handle and coupled to a molded-plastic rocker trigger pivotably mounted on the front of the pistol-grip handle; the trigger controls the "forward" and "reverse" movement of a reversible electric motor within the housing. The tool, for example, may comprise a portable electric impact wrench having a double-insulated design. With such a design, unauthorized removal of the trigger for access to the switch may interfere with the requirements of double insulation, especially with respect to minimum clearances. Replacement of the switch may be necessary for service or repair of the tool, and it would be desirable to have an arrangement whereby the switch could be replaced easily and without inadvertent removal of the trigger, thereby maintaining the double insulation requirements.

SUMMARY OF THE INVENTION

It is an object of the present invention to provide a convenient access to the switch in a portable electric double-insulated tool, for replacement of the switch, without inadvertent removal of the switch trigger.

It is another object of the present invention to provide a switch cover, electric switch, trigger, cable and terminal means—all as a complete integral subassembly—and to provide for a variety of such subassemblies to be used with a standard molded plastic field case and integrally-molded switch handle, thereby obtaining a desired degree of standardization and reducing overall manufacturing costs for a line of double-insulated power tools.

It is yet another object of the present invention to provide a mounting bracket secured to the back of the switch cover for retaining the switch in a recess formed in the cover, whereby the switch is accessible only upon removal of the switch cover from the switch handle.

In accordance with the teachings of the present invention, a double-insulated electric tool has a housing with a motor therein, and further has a pistol-grip handle formed from insulating material and depending therefrom. The handle comprises a switch handle portion and a switch cover portion removably secured to the switch handle forwardly thereof. An electric switch is enclosed by the handle and is mounted to the back of the switch cover. The switch is provided with an actuating member, and a trigger is mounted on the front of the switch cover and is coupled to the switch actuating member. With this arrangement, the switch is accessible only upon removal of the switch cover from the switch handle, thereby precluding an inadvertent interference with the double insulation feature of the tool.

In accordance with the further teachings of the present invention, the double-insulated power tool has a molded-plastic field case with a motor therein, and further has a plastic switch handle integrally molded with the field case. A molded plastic switch cover is removably secured to the switch handle. An electric switch is mounted on the back of the switch cover. The switch is enclosed at least partially by the switch handle, and the switch is provided with an actuating member. An electric cable is carried by the back of the switch cover and is retained thereto. Terminal means are provided in the back of the switch cover for facilitating electrical inter-connection of the motor, switch and cable. A trigger is mounted on the front of the switch cover, independently of the switch, and is coupled to the switch actuating member. With this arrangement, the switch cover, switch, cable, terminal means and trigger comprise a complete integral subassembly. As a result, a number of these subassemblies may be designed and tooled for a variety of tools, while the molded plastic field case and its integral switch handle may become a standard for all such tools.

These and other objects of the present invention will become apparent from a reading of the following specification, taken in conjunction with the enclosed drawings.

BRIEF DESCRIPTION OF THE DRAWINGS

FIG. 1 is a side elevation of a typical power tool in which the teachings of the present invention may find particular utility;

FIG. 2 is an enlarged portion of FIG. 1, partly in elevation and partly in section, showing the molded plastic field case for the motor, and further showing the plastic switch handle integrally molded with the field case;

FIG. 3 corresponds to a portion of FIG. 2, but shows the switch cover, switch, cable, strain relief, mounting bracket with terminals, and the trigger mounted on the front of the switch cover independently of the switch—all as a complete integral subassembly—in exploded elevation with respect to the molded field case and its integrally molded switch handle;

FIG. 5 is a section view taken along the lines 5—5 of FIG. 3, showing the coupling between the trigger and the switch toggle;

FIG. 8 is a rear elevation of the trigger, showing its internal boss with a blind axial bore formed therein for coupling the trigger to the switch toggle;

FIG. 9 is a section view, taken along the lines 9—9 of FIG. 6, showing the pair of side walls in the switch cover, the central web portion, and the pair of round bosses between the web and the side walls for pivotably mounting the trigger on the switch cover independently of the switch;

FIG. 10 is a section view, taken along the lines 10—10 of FIG. 9, showing one of the round bosses on the switch cover, and further showing (in phantom) one of the respective slots in the trigger for pivotably mounting the trigger to the switch cover;

FIG. 11 is a section view, taken along the lines 11—11 of FIG. 6, showing the internal recess in the switch cover for receiving the switch;

FIG. 12 is a section view, taken along the lines 12—12 of FIG. 6, showing the raised boss adjacent to the switch recess in the elongated switch cover, the boss having a channel formed therein substantially along the elongated dimension of the cover for receiving the cable;

FIG. 13 is a section view, taken along the lines 13—13 of FIG. 3, showing the manner in which the cable is retained in the switch cover;

FIG. 14 is a top plan view of the mounting bracket for retaining the switch in its recess in the switch cover;

FIG. 15 is a section view, taken along the lines 15—15 of FIG. 14;

FIG. 16 is a section view, taken along the lines 16—16 of FIG. 3, showing the manner in which the mounting bracket is secured to the switch cover for retaining the switch, the terminals and wires retained on the mounting bracket being removed for ease of illustration;

FIG. 17 is a partial exploded perspective view of the switch and mounting bracket, showing one of the terminals on the mounting bracket for facilitating electrical connection between the cable, switch and motor;

FIG. 18 is a top plan view of an alternate embodiment of the mounting bracket, showing the notches formed in one of the transverse members in the mounting bracket for receiving respective wires in the cable;

FIG. 19 is a section view, taken along the lines 19—19 of FIG. 18; and

FIG. 20 is a section view, taken along the lines 20—20 of FIG. 2, showing the manner in which the subassembly of the switch cover and its integral components is removably secured to the switch handle forwardly thereof.

DESCRIPTION OF THE PREFERRED EMBODIMENT

Figure 4:
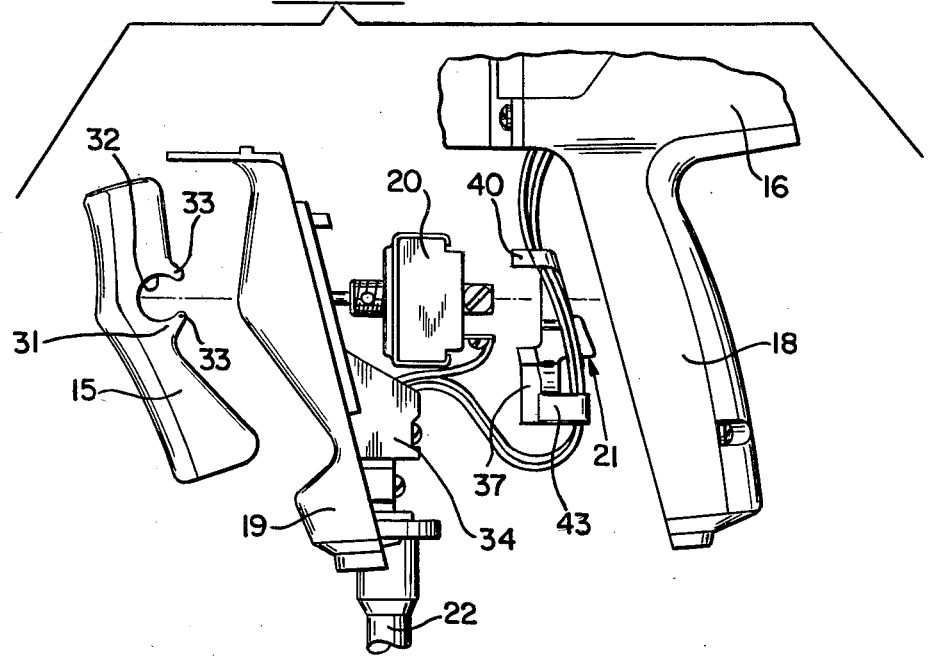
FIG. 4 is an exploded elevation of the integral subassembly of the switch cover, switch, cable, mounting bracket, and trigger.

With reference to FIG. 1, there is illustrated a double-insulated electric impact wrench 10 with which the teachings of the present invention may find particular utility. However, it will be appreciated by those skilled in the art that the teachings of the present invention are equally applicable to a wide variety of double-insulated power tools and other electrical appliances and devices. With this in mind, the tool comprises an overall housing 11 including a clutch housing portion 12 for an impact clutch mechanism (not shown), an output spindle 13, a depending pistol-grip handle 14, and a trigger 15 forwardly of the pistol-grip handle.

With reference again to FIG. 1, and with further reference to FIGS. 2, 3 and 4, the overall housing includes a field case 16 which is preferably molded from a suitable plastic material having electrical insulating qualities. The field case houses a motor 17 for driving the output spindle in a manner understood by those skilled in the art. The pistol-grip handle 14 includes a switch handle portion 18 integrally molded with the field case as a unitary component. The pistol-grip handle further includes a switch cover portion 19 removably secured to the switch handle portion forwardly thereof. The switch cover carries a switch 20, a mounting bracket 21, the trigger 15, and an electrical line cord or cable 22—all as a complete unitary subassembly generally designated by 23—secured to the switch handle 18 and its integrally-molded field case 16. With this arrangement, the field case and integral switch handle may be designed and tooled as a standard to be used for a wide variety of power tools, such as a complete line of drills for different purposes and applications, and the integral subassembly 23 may then be designed to accommodate each particular power tool. With the field case and integral switch handle as a standard, tooling and inventory costs are reduced; and as a result, an overall cost savings may be realized in the manufacture of a line of power tools, especially a line of double-insulated ("D.I.") power tools intended for heavy-duty industrial purposes.

With reference again to the FIGS. 2, 3 and 4, and with further reference to the remaining drawings, the switch cover 19 comprises an elongated piece which is preferably molded from a suitable insulating plastic material. The cover has pair of side walls 24 enclosing a recess 25 for receiving the switch 20, which is preferably of the reversing type. A round boss 26 is formed integrally with each wall and projects laterally therefrom internally of the cover. A central web 27 connects the bosses and has an opening 27a formed therein. A switch toggle 28 (or other switch actuating member) passes through the opening and is received in a blind axial bore 29 formed in an internal boss 30 in the trigger, as shown more clearly in FIG. 5, thereby coupling the trigger to the switch. The trigger is molded from a suitable plastic insulating material and is formed as a channel. The channel has a pair of parallel side walls 31, and an open slot 32 is formed in each wall. Each slot is partially circular in plan outline, as shown in FIGS. 4 and 10, and terminates in a pair of ears 33. The ears are snapped over the respective round bosses 26 so that the bosses are seated within the slots, thereby pivotably mounting the rocker trigger 15 on the front of the switch cover 19. The trigger has a neutral position and further has alternate "forward" and "reverse" positions for controling the reversing switch and hence the reversible motor 17. This accommodates various assembly and disassembly operations performed by the impact wrench 10.

Figure 6:
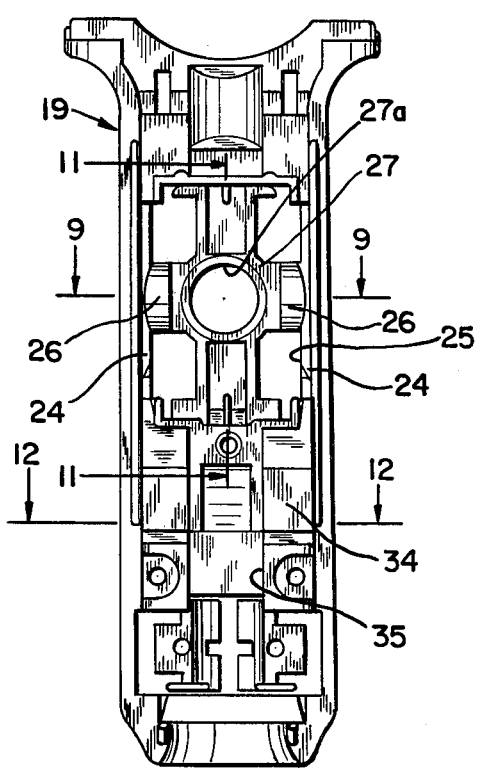
FIG. 6 is a rear elevation of the switch cover, with the switch and trigger removed.
Figure 7:
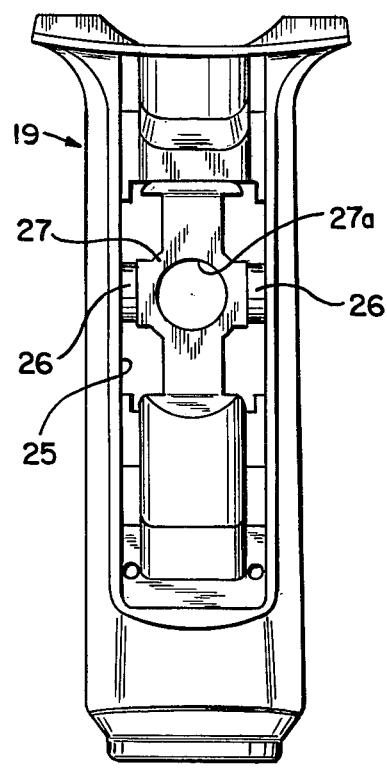
FIG. 7 is a front elevation of the switch cover, with the switch and trigger removed.

With reference again to FIGS. 6 and 7 and with further reference to FIGS. 11 and 12, the switch cover 19 has a raised boss 34 adjacent to recess 25 for the switch. The raised boss projects within the switch handle 18, in the assembly of the integral subassembly 23 to the switch handle, as will be appreciated from FIGS. 3 and 4. A channel 35 is formed in the raised boss along the elongated dimension of the cover, and the cable is received within the channel and is carried by the switch cover.

With reference again to FIGS. 3 and 4, and with further reference to FIGS. 14–17, the mounting bracket has a first portion 37 nested within the channel 35 and secured to the raised boss by means of a screw 38 (as shown in FIG. 16). The mounting bracket further has a second portion 39 including a pair of transverse members 40 and 41 joined by an elongated strap member 42. The members 40 and 41 engage the switch body for retaining the switch in its recess 25 in the switch cover. A pair of terminals 43 are carried by the mounting bracket for facilitating electrical connection between the cable, switch and motor. Preferably, but not necessarily, the cable is of the three-wire type and comprises wires 44, 45 and 46 as understood by those skilled in the art.

With reference to FIGS. 3 and 13, the cable 22 has a strain relief 47, provided with an enlarged integral collar 48. The collar has a familiar "double dee" plan outline and is received in complementary recesses formed in the switch handle and switch cover, respectively, the recess in the switch cover being shown as at 49.

With reference to FIG. 18, an alternate embodiment 21' of the mounting bracket has a pair of notches 50 formed in the transverse member 40' for receiving two of the wires.

With reference to FIGS. 2 and 20, the integral subassembly 23 (of the switch cover 19 and the components carried thereby) is suitably keyed to the switch handle 18 and is removably secured thereto by means of a pair of screws, one of which is shown as at 51. The screw 51 passes through an opening 52 in the switch handle and is received in a boss 53 in the switch cover.

Obviously, many modifications may be made without departing from the basic spirit of the present invention. Accordingly, it will be appreciated by those skilled in the art that within the scope of the appended claims, the invention may be practiced other than has been specifically described herein.

We claim:

1. A double-insulated power tool, comprising:
   (a) a field case formed of electrically insulating material and including an integral depending handle portion;
   (b) an electric motor mounted in the field case;
   (c) a replaceable switch having a switch body and an actuating member for controlling the motor;
   (d) mounting means for connecting the switch to the tool;
   (e) the mounting means including a subassembly having a switch cover, a trigger, and a mounting bracket, all being formed of electrically insulating material;
   (f) the switch cover having a back and a front, and being removably secured to the handle portion forwardly thereof;
   (g) the back of the switch cover defining a recess, and further defining an opening formed in the recess through the cover;
   (h) the switch being located in the switch cover recess with the actuating member protruding through the opening;
   (i) the trigger being coupled to the actuating member, and further being pivotally mounted on the switch cover adjacent the front thereof in overlying relation to the actuating member;
   (j) the mounting bracket being connected in overlying relation to the switch;
   (k) an electrical supply cable entering the tool adjacent the handle portion and including at least two electrical conductors;
   (l) the mounting bracket including guiding means for orienting an unbroken electrical conductor from the cable entry to the field case, interior of the switch cover and the handle portion;
   (m) the mounting bracket further including two transverse members joined by an elongated strap member; and
   (n) the transverse members engaging the switch body.

2. The power tool claimed in claim 1, wherein the mounting bracket guiding means including a notch formed on one of the transverse members for receiving the electrical conductor.

3. The power tool claimed in claim 1, further comprising terminal means connected to the mounting bracket for facilitating electrical connection of the motor, switch, and electrical conductors.

4. The power tool claimed in claim 1, wherein the trigger includes an elongated rocker member pivotally mounted on the front of the switch cover.

5. The power tool claimed in claim 4, wherein:
   (a) the switch actuating member including a toggle;
   (b) the switch cover including a pair of round bosses;
   (c) the rocker member having a pair of side walls, each wall defining an open slot, each slot being partially circular in plan and terminating in a pair of ears snapped over the round bosses for seating the bosses in the slots;
   (d) the trigger having a neutral position, a "forward" position and a "reverse" position; and
   (e) the opening in the switch cover being located intermediate the round bosses.

6. The power tool claimed in claim 1 wherein the mounting bracket guiding means including one of the transverse members being formed in a "U"-shape, the arms of the "U"-shaped member capturing the electrical conductor, and the ends of the arms of the "U"-shaped member engaging the switch body.

* * * * *